July 11, 1939.  C. L. STANCLIFF  2,165,311
VALVE SEAT
Filed Jan. 3, 1938   2 Sheets-Sheet 1
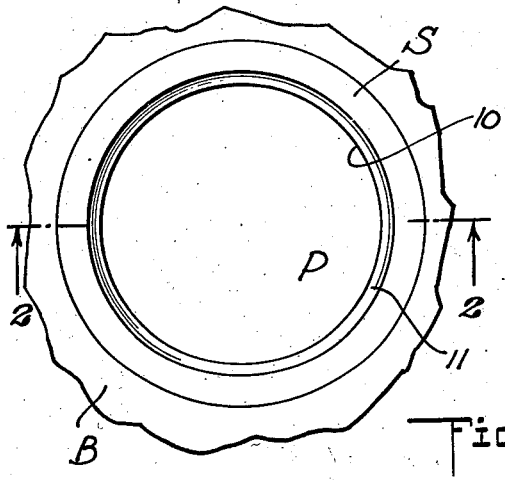
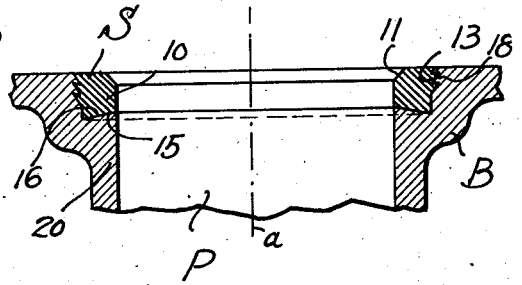
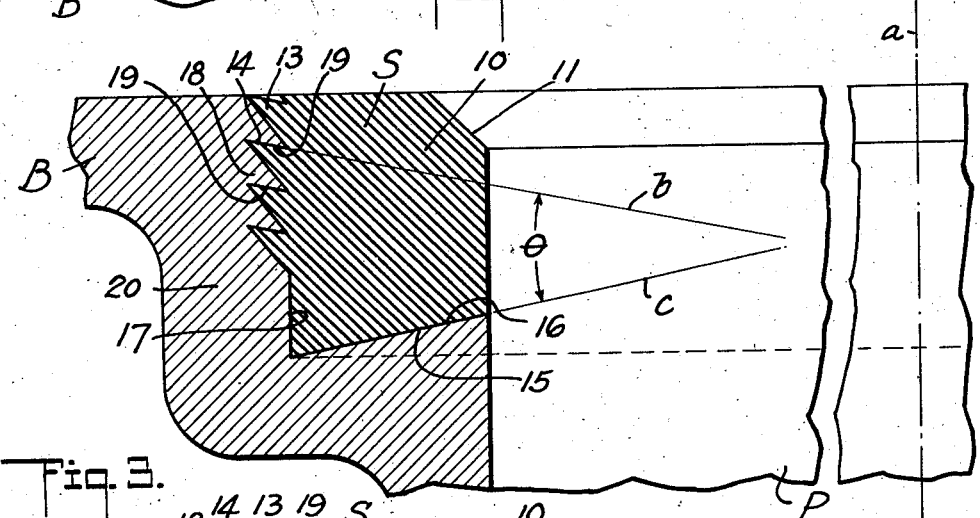
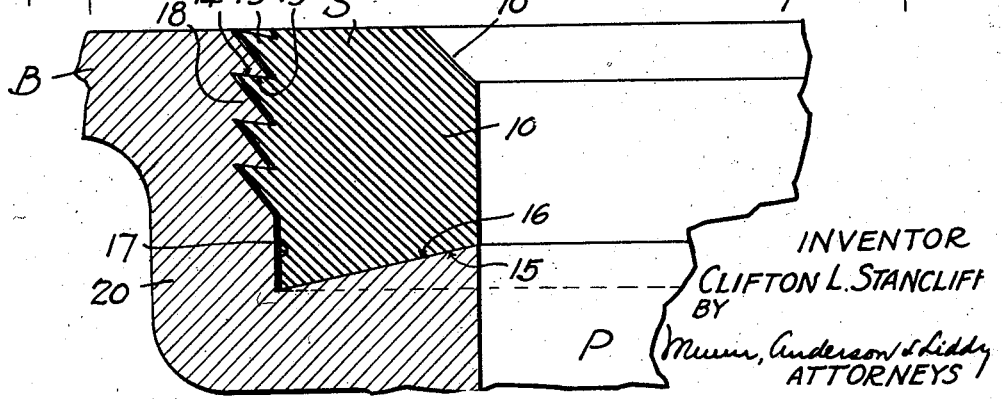
INVENTOR
CLIFTON L. STANCLIFF
BY
ATTORNEYS July 11, 1939.   C. L. STANCLIFF   2,165,311
VALVE SEAT
Filed Jan. 3, 1938   2 Sheets-Sheet 2
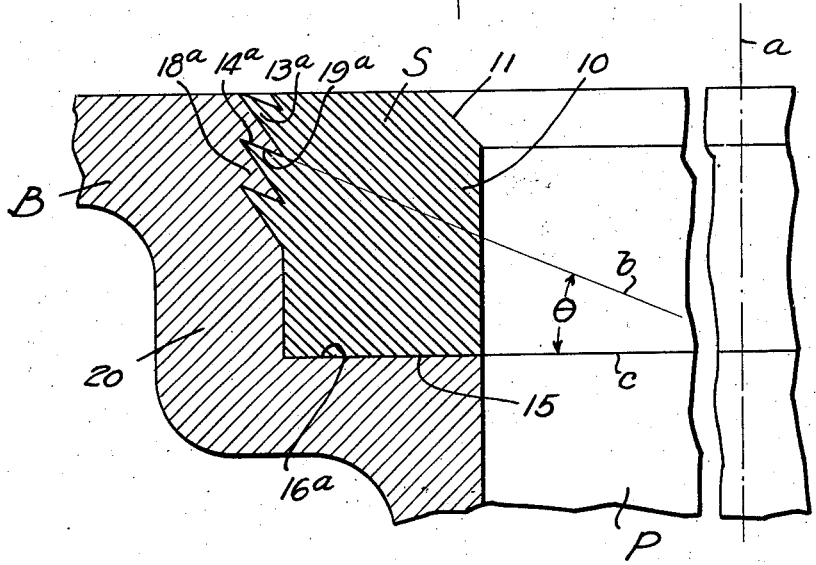
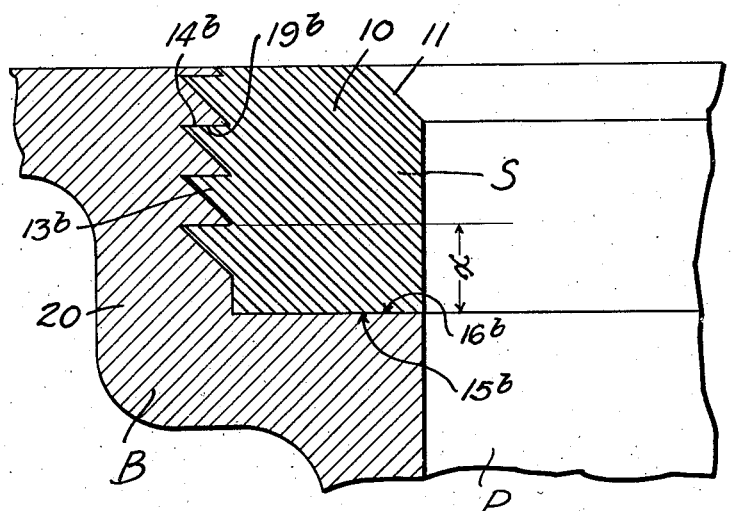
INVENTOR
CLIFTON L. STANCLIFF
BY
ATTORNEYS Patented July 11, 1939

2,165,311

UNITED STATES PATENT OFFICE 2,165,311

VALVE SEAT

Clifton L. Stancliff, Bakersfield, Calif.

Application January 3, 1938, Serial No. 182,944

10 Claims. (Cl. 123—188)

This invention relates generally to that class of machinery employing valves, such as internal combustion engines, compressors, and other mechanisms, and more particularly to the valve seats thereof.

In order to compensate for wear and deterioration under high temperatures, it is the present practice with many manufacturers, to construct valve seats of tungsten, "Stellite", and other hard metals, which necessitates that provision be made for holding such separately constructed valve seats immovably in place in the machine.

However, it has been found extremely difficult, and in many instances impossible, to prevent loosening and displacement of such inserted or replaceable valve seats as a result of temperature variations, whereby the intended advantages are largely, if not entirely, lost by expensive repair operations and loss of use of the machine.

An object of the present invention is to provide a separate valve seat which is structurally characterized and associated with a valve port in such manner as to positively insure that the seat will remain tightly in place irrespective of variations in temperature between the seat and the surrounding or supporting metal, whereby to obtain the advantages of longer life, resistance to pitting and less valve grinding, all without any extraneous fastening means or difficulty in installation.

With this and other objects in view, the invention consists in the combinations, arrangements and functional relationships of elements as set forth in the following specification and particularly pointed out in the appended claims.

In the accompanying drawings,

Figure 1 is a fragmentary plan view of a cylinder block showing one form of valve seat embodying this invention, applied to a valve port in the block;

Figure 2 is a sectional view taken on the line 2—2 of Figure 1;

Figure 3 is an enlarged fragmentary sectional view taken on the line 3—3 of Figure 1, and illustrating the condition of the parts before being subjected to operating temperatures of the machine;

Figure 4 is a view similar to Figure 3 and illustrating the condition of the parts after having been subjected to the operating temperatures of the machine;

Figure 5 is a view similar to Figure 4, and illustrating a second form of valve seat embodying the invention;

Figure 6 is a view similar to Figure 4, and illustrating a third form of valve seat embodying the invention.

Referring specifically to the drawings and particularly to Figures 1 to 4, inclusive, the valve seat indicated generally by S is shown for the purpose of illustration associated with a valve port P in a support such as the cylinder block B of an internal combustion engine, although it will be clearly understood that the invention is applicable to any class of machinery in which such variations in temperature can exist as would adversely affect the use of separate relatively hard valve seats of the prior art.

The valve seat S is preferably constructed of tungsten or such alloy as will most effectively resist wear and deterioration from high temperatures and temperature fluctuations, and is in the form of an annular body 10 having the usual beveled annular face 11 with which a poppett valve (not shown) co-acts to open and close the port during the cycle of operation of the engine.

The body 10 is provided with external threads 13 of the cross sectional contour shown most clearly in Figures 3 and 4, from which it will be noted that the working face 14 of the threads, if prolonged towards the axial center line $a$ of the valve seat, as indicated by the line $b$, in Figure 3, will be in intersecting relationship to the prolongation line $c$ of the inner end face 15 of the valve seat. Thus these opposed faces of the valve seat are relatively inclined in a direction to converge towards said axial center line $a$ when the valve seat is viewed in diametric cross section.

It is to be understood that the term "working face" is applied to that portion of the threads upon which the axial thrust is imposed or reacts when the valve seat is screwed tightly into the cylinder block B to bring the inner end face 15 of the valve tightly against the opposing complementary face 16 forming the bottom or annular shoulder of a recess 17 which is bored in the cylinder block around the port P and in concentric relationship thereto.

The annular wall 20 of the recess 17 is provided with threads 18 which are complementary to the threads 13 and thus have a working face 19 opposing and in abutting relationship to the working face 14 of the valve seat threads. Therefore, it will be clear that the thread faces 14 and 19 are in parallelism, and that the faces 15 and 16 are in parallelism but relatively inclined to the faces 14 and 19 as above described. It will be noted that in this form of the invention, the faces 14 and 19 and the faces 15 and 16 are at other than a right angle to the axial center line $a$ so as to function in a novel manner in the operation of the invention as follows:

When the valve seat S is first installed in the cylinder block B, it is screwed tightly by a suitable tool (not shown) into the recess 17, as shown in Figure 3. During operation of the engine, the valve seat S becomes heated to a higher degree than the wall 20 of the cylinder block surrounding the valve seat, due to the fact that the valve seat is directly subjected to heat of burning fuel, whereas said wall is cooled by water or air depending on which type of cooling system is employed in the engine.

The effect of this temperature differential which exists between the wall 20 and the valve seat S is to cause the latter to expand to a greater extent than the former, the greater amount of expansion taking place in a direction radially of the valve seat, and the lesser amount of expansion taking place in a direction axially of the valve seat. Due to the converging relationship of the thread faces 14 and 19 to the faces 15 and 16, the excess radial and axial expansion of the valve seat will be automatically compensated for, as the faces 14 and 15 of the valve seat will ride upon and constantly remain in contact with the faces 19 and 16, respectively, as shown in Figure 4. Now, as the engine cools, the contraction of the wall 20 and valve seat will be similarly compensated for, as the co-acting faces will merely slide upon each other so as to positively maintain the valve seat tight.

The invention will be equally effective in maintaining the valve seat tight in the event that the engine cooling system fails and causes the cylinder block to become heated to a greater extent than the valve seat. Irrespective of whether the cylinder block or the valve seat is heated to a greater or lesser degree, the working faces 14 and 19 will operate automatically in conjunction with the faces 15 and 16, to maintain the valve seat tight, for it will be appreciated that any relative expansion and contraction of the block and seat radially and axially will merely result in the co-acting faces above set forth riding upon each other, the exact relative angles of the faces being precalculated to obtain this effect so that all temperature differentials between the block and seat will be automatically compensated for. The same functioning of the invention will occur with its use in air-cooled motors.

It is to be understood that the original fit of the seat in the cylinder block is such that, when the parts are cold, there will be sufficient clearance for the seat to expand tightly against the cylinder block without being constricted or crushed thereby. Thus, the seat will not become warped or distorted from excessive pressure against the cylinder block, and will remain tightly in place irrespective of temperature variations. This original clearance is, of course, very slight, but is distinguished from various types if seats heretofore proposed which have a press fit in the block and are from .005″ to .010″ tight, and, as a consequence, are apt to crack through to the wall of the cylinder block, when the parts are heated.

Reference will now be had to Figure 5, which shows a modified form of the invention differing from the previously described form only in that the angle $\theta$ and the resulting action to maintain a tight fit of the valve seat, are obtained by increasing the angle of the co-acting working faces 14$a$ and 19$a$ of the threads 13$a$ and 18$a$, and correspondingly reducing the angle of the co-acting faces 15$a$ and 16$a$ to zero, i. e., so that they are arranged in parallelism with a line at right angles to the axial center line $a$ of the valve seat. As the relative convergency of the faces 14$a$ and 19$a$ to the faces 15$a$ and 16$a$ is maintained, the functioning of this form of the invention is identical with that previously described.

In Figure 6, a third form of the invention is disclosed, and is particularly adapted for use in a cool running motor or with any motor which is not subjected to any abuse or to such loads as would affect its perfect cooling. For this condition of operation, the working faces 14$b$ and 19$b$ of the threads can be arranged in parallelism to the faces 15$b$ and 16$b$ and transversely or at a right angle to the axis of the seat S. This form of the invention is thus distinguished from the forms previously described by having no angle instead of the angle $\theta$ between the working faces of the threads and the opposed faces of the seat and block, it being found in practice that a variable angle from a maximum to no angle should be chosen in accordance with the maximum temperature at which the motor is operated. It will be clear that the higher the temperature of the motor, the greater the radial and axial expansion will be, and hence the larger the angle $\theta$ should be to compensate therefor, and maintain the seat tight.

In the no-angle form shown in Figure 6, the threads 13$b$ will extend close to the face 16$b$ of the seat so that the axial distance $x$ between the face 16$b$ and the working face 14$b$ of the thread nearest thereto will be such that at the maximum operating temperature of the motor, the axial expansion of the seat would approximate .0005 of an inch. With this relatively small amount of axial expansion, there will be sufficient elasticity in the metal or spring in the thread to maintain the co-acting surfaces 14$b$, 19$b$ and 15$b$, 16$b$ in contact so that the seat will remain tight when the motor is cold.

What is claimed is:

1. The combination with a support having a valve port, of a valve seat for said port; co-acting threads on the valve seat and in the support by which the valve seat can be tightly screwed in place; the valve seat having an end face and the support having a shoulder co-acting therewith to limit the extent to which the valve seat can be screwed into the support; said end face and said shoulder being in inclined relationship to one face of said threads, operable to maintain the valve seat tightly in place irrespective of variations in heating and cooling of the support and the valve seat.

2. The combination with a support having a valve port, of a valve seat for said port; co-acting threads on the valve seat and in the support by which the valve seat can be tightly screwed in place; the valve seat having an end face and the support having a shoulder co-acting therewith to limit the extent to which the valve seat can be screwed into the support; said end face and that face of said threads of the valve seat in opposed relationship thereto being so disposed relative to each other as to co-act in maintaining the valve seat tightly in place irrespective of variations in heating and cooling of the support and valve seat.

3. The combination with a support having a valve port, of a valve seat for said port; co-acting threads on the valve seat and in the support by which the valve seat can be tightly screwed in place; the valve seat having an end face and the support having a shoulder co-acting therewith to limit the extent to which the valve seat can be screwed into the support; said end face and that face of said threads of the valve seat in opposed relationship thereto being relatively inclined in such directions that prolongations of the faces will converge towards the axial center line of the valve seat as viewed in diametric cross section for the purpose described.

4. A valve seat comprising an annular body; and co-acting means on the body defining opposed surfaces in such inclined relationships to each other that prolongations of such surfaces will converge towards the axial center line of the body as viewed in diametric cross section.

5. A valve seat comprising an annular body having an annular end face; external threads on the body; said end face and that face of said threads in opposed relationship thereto being relatively inclined in such directions that prolongations of the faces will converge towards the axial center line of the body as viewed in diametric cross section.

6. The combination with a support having a valve port, of a valve seat for said port; co-acting threads on the valve seat and in the support by which the valve seat can be tightly screwed in place; the valve seat having an end face and the support having a shoulder co-acting therewith to limit the extent to which the valve seat can be screwed into the support; said end face and said shoulder being in parallel relationship to the working face of said threads, and at a right angle to the axis of said seat as viewed in diametric cross section, for the purpose described.

7. A valve seat comprising a body having a limiting face; threads on the body; said limiting face and the working face of said threads being in parallel relationship and at a right angle to the axis of said seat as viewed in diametric cross section.

8. A valve seat comprising a body having a limiting face; threads on the body; said limiting face and the working face of said threads being relatively inclined in such directions that prolongations of the faces will converge towards the axial center line of the valve seat as viewed in diametric cross section.

9. The combination, with a support having a valve port, of a valve seat for said port; the support and valve seat having means co-acting to secure the valve seat to the support; said means including at least two opposed surfaces on the support, and two opposed surfaces on the valve seat complementarily related to the support surfaces and disposed to be maintained in tight contact therewith irrespective of unequal heating and cooling of the valve seat and support.

10. The combination, with a support having a valve port, of a valve seat for said port; the support and valve seat having means co-acting to secure them together in response to relative rotation therebetween; said means including at least two opposed unidirectional helical surfaces on the support, and two opposed unidirectional helical surfaces on the valve seat complementarily related to the support surfaces and disposed to be maintained in tight contact therewith irrespective of unequal heating and cooling of the valve seat and support.

CLIFTON L. STANCLIFF.